Nov. 11, 1947.                F. E. ALTMAN ET AL                2,430,550
                                PLASTIC OBJECTIVE
                               Filed March 13, 1943
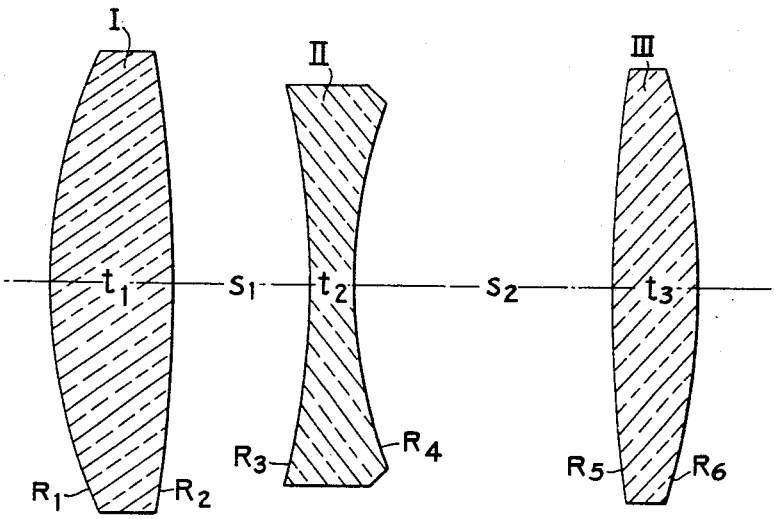
F = 100 mm.                                                        f/3.7
| LENS | $N_D$ | $\nu$ | RADII | SPACINGS |
|---|---|---|---|---|
| I | 1.523 | 59.0 | $R_1 = +\ 30.3$ mm.<br>$R_2 = -140.0$ " | $t_1 = 6.92$ mm.<br>$s_1 = 7.64$ " |
| II | 1.564 | 36.6 | $R_3 = -\ 42.4$ "<br>$R_4 = +\ 29.0$ " | $t_2 = 2.39$ "<br>$s_2 = 14.33$ " |
| III | 1.523 | 59.0 | $R_5 = +141.8$ "<br>$R_6 = -\ 38.4$ " | $t_3 = 4.78$ " |
FRED E. ALTMAN
RAE WYLAND
INVENTORS
BY
ATTORNEY Patented Nov. 11, 1947

2,430,550

UNITED STATES PATENT OFFICE 2,430,550

PLASTIC OBJECTIVE

Fred E. Altman and Rae Wyland, Rochester, N. Y., assignors to Eastman Kodak Company, Rochester, N. Y., a corporation of New Jersey Application March 13, 1943, Serial No. 479,116

1 Claim. (Cl. 88—57)

This invention relates to objectives and more particularly to objectives of the type having three air-spaced, simple elements, the outer ones of which are positive and the inner one negative.

It is an optical requirement of these lenses that the index of dispersion ($v$) of the positive lenses be high and of the negative low. A very large number of formulae for such objectives are known, employing many known types of glass. While glasses are known having indices of dispersion lower than 40, these all have an index of refraction higher than 1.6.

We have designed a lens in which the negative is made of a plastic material having an index of refraction for the D line of 1.56 and an index of dispersion of 36.6, a combination of properties not available in glass. Such a material is polymerized benzyl methacrylate which is now available as a plastic on the market.

We have designed an objective of the type described utilizing this material for the negative element and utilizing for the positives polymerized cyclohexyl methacrylate, a plastic also on the market and having optical properties substantially identical with very old and well known glasses.

It is thus possible to make an objective very cheaply that is rugged and sufficiently corrected for certain purposes, particularly for instruments of short life and comparatively limited use. Such an objective is shown in section in the single figure of the accompanying drawing, together with a table of the constants of the objective. The following formula is for an objective having a focal length of 100, an aperture of f/3.7, and useful over an angular field of 13° from the axis. The drawing corresponds to this formula exactly.

| Lens | NC | ND | NF | v |
|---|---|---|---|---|
| I and III | 1.521 | 1.523 | 1.530 | 59.0 |
| II | 1.560 | 1.564 | 1.575 | 36.6 |

| Lens | $N_D$ | v | Radii | Spacings |
|---|---|---|---|---|
| I | 1.523 | 59.0 | $R_1=+30.3$ mm. $R_2=-140.0$ mm. | $t_1=6.92$ mm. $s_1=7.64$ mm. |
| II | 1.564 | 36.6 | $R_3=-42.4$ mm. $R_4=+29.0$ mm. | $t_2=2.39$ mm. $s_2=14.33$ mm. |
| III | 1.523 | 59.0 | $R_5=+141.8$ mm. $R_6=-38.4$ mm. | $t_3=4.78$ mm. |

The + and − signs in the fourth column refer respectively to surfaces convex and concave to the incident light.

Having thus described our invention, what we claim is:

An objective having approximately the following characteristics:

| Lens | $N_D$ | v | Radii | Spacings |
|---|---|---|---|---|
| I | 1.52 | 59 | $R_1=+.30f$ $R_2=-1.40f$ | $t_1=.07f$ $s_1=.08f$ |
| II | 1.56 | 37 | $R_3=-.42f$ $R_4=+.29f$ | $t_2=.024f$ $s_2=.14f$ |
| III | 1.52 | 59 | $R_5=+1.40f$ $R_6=-.38f$ | $t_3=.05f$ | where the Roman numerals in the first column refer to the lens elements numbered from front to rear, $N_D$ is the index of refraction for the D line of the spectrum, $v$ is the dispersion index, $R_1$ to $R_6$ are the radii of curvature of the refractive surfaces numbered from the front rear, + and − signs referring respectively to surfaces convex and concave to the incident light, $t_1$ to $t_3$ are the thickness of the elements, $s_1$ and $s_2$ are the air spaces between the elements, and f is the focal length of the objective.

FRED E. ALTMAN.
RAE WYLAND.

REFERENCES CITED

The following references are of record in the file of this patent:

UNITED STATES PATENTS

| Number | Name | Date |
|---|---|---|
| 1,987,878 | Tronnier | Jan. 15, 1935 |
| 2,279,372 | Herzberger | Apr. 14, 1942 |
| 2,298,090 | Warmisham | Oct. 6, 1942 |
| 1,980,483 | Hill | Nov. 13, 1934 |
| 2,086,286 | Stanley | July 6, 1937 |
| 2,314,838 | Kingston | Mar. 23, 1943 |
| 1,035,408 | Beck | Aug. 13, 1912 |
| 1,892,162 | Richter | Dec. 27, 1932 |
| 2,193,742 | Rohm et al. | Mar. 12, 1940 |